United States Patent [19]
Uz et al.

[11] Patent Number: 6,130,963
[45] Date of Patent: Oct. 10, 2000

[54] MEMORY EFFICIENT DECODING OF VIDEO FRAME CHROMA

[75] Inventors: K. Metin Uz, Los Altos; Vijay Maheshwari, Fremont, both of Calif.

[73] Assignee: C-Cube Semiconductor II, Inc., Milpitas, Calif.

[21] Appl. No.: 08/755,445

[22] Filed: Nov. 22, 1996

[51] Int. Cl.$^7$ .................................. G06K 9/36; G06K 9/46
[52] U.S. Cl. ........................................................... 382/233
[58] Field of Search ................................... 382/233, 166, 382/300, 260, 261; 348/715, 716, 717

[56] References Cited

U.S. PATENT DOCUMENTS

| | | | |
|---|---|---|---|
| 5,541,658 | 7/1996 | Ishiwata | 348/394 |
| 5,717,461 | 2/1998 | Hoogenboom | 348/394 |
| 5,818,533 | 10/1998 | Auld et al. | 348/412 |
| 5,835,636 | 11/1998 | Auld . | |

Primary Examiner—Phuoc Tran
Attorney, Agent, or Firm—Proskauer Rose LLP

[57] ABSTRACT

A method and apparatus for memory-efficient decoding of frame chroma of progressive frames. During the display of a first field of the frame, lines of interpolated chroma values are calculated for both even and odd field lines. The lines of interpolated values for the first field are generated by applying a two-tap filter with coefficients (¼, ¾) to corresponding lines of chroma samples, and the lines of interpolated values for the second field are generated by applying a two-tap filter with coefficients (¾, ¼) to the corresponding lines of chroma samples. The lines of first field interpolated values are displayed with the first field, while a given even line of second field interpolated values is written to memory locations occupied by a line of chroma samples used to generate the given line. The other line of chroma samples used to generate the given line of second field interpolated values is allowed to be overwritten with additional progressive frame data, such that one line of decoder memory is freed up for each pair of displayed lines. This permits the frame chroma decoding process to be performed utilizing a total memory capacity of only 2.5 framestores. The odd lines of second field interpolated values are generated by averaging two of the previously-stored adjacent even lines of second field interpolated values, such that decoded video quality degradation is minimized.

16 Claims, 3 Drawing Sheets

| STEP | DECODE | DISPLAY |
|---|---|---|
| 1 | DECODE STARTS AND PROCEEDS TO THE MIDDLE OF THE FRAME. CHROMA SAMPLES ARE STORED AS IS. | THE SECOND FIELD OF THE PRECEDING FRAME IN DISPLAY ORDER IS BEING DISPLAYED. (SEE STEP 5). |
| 2 | THIS IS ONE FIELD TIME LATER. HALF OF THE FRAME IS DECODED. FRAMESTORE CONTAINS THE HALF FRAME. | BEGIN DISPLAY OF THE FIRST FIELD FROM THE FRAMESTORE. THE CHROMA SAMPLES ARE INTERPOLATED WITH (1/4,3/4) FILTER. EVERY EVEN FIELD LINE, THE INTERPOLATION USING (3/4,1/4) IS STORED IN ONE LINE. THE OTHER LINE IS AVAILABLE FOR DECODING. |
| 3 | THE DECODE AND DISPLAY ARE LOCKED: WHENEVER 16 LINES ARE DISPLAYED, THE ROW OF DECODED MACROBLOCKS GO INTO THE FRAMESTORE. | DISPLAY OF THE FIRST FIELD PROCEEDS. |
| 4 | DECODING IS FINISHED. FRAMESTORE CONTAINS THE CORRECT (i.e. READY TO DISPLAY) CHROMA VALUES FOR THE EVEN CHROMA LINES ONLY. | DISPLAY OF THE FIRST FIELD IS FINISHED. |
| 5 | DECODING PROCEEDS TO THE NEXT FRAME. | START DISPLAY OF THE SECOND FIELD FROM THE FRAMESTORE. EVEN FIELD LINES ARE DISPLAYED AS IS, ODD LINES ARE OBTAINED BY AVERAGING THE TWO EVEN LINES. |

FIG. 1
(PRIOR ART)

| STEP | DECODE | DISPLAY |
|---|---|---|
| 1 | DECODE STARTS AND PROCEEDS TO THE MIDDLE OF THE FRAME | THE SECOND FIELD OF THE PRECEDING FRAME IN DISPLAY ORDER IS BEING DISPLAYED. THE LINES FREED UP ARE USED FOR DECODING. |
| 2 | THIS IS ONE FIELD TIME LATER. HALF OF THE FRAME IS DECODED. FRAMESTORE CONTAINS THE HALF FRAME. | BEGIN DISPLAY OF THE FIRST FIELD FROM THE FRAMESTORE. |
| 3 | THE DECOCE AND DISPLAY ARE LOCKED: WHENEVER 16 LINES ARE DISPLAYED, THE ROW OF DECODED MACROBLOCKS GO INTO THE FRAMESTORE. | DISPLAY OF THE FIRST FIELD PROCEEDS. |
| 4 | DECODING IS FINISHED. FRAMESTORE CONTAINS THE SECOND FIELD ONLY. | DISPLAY OF THE FIRST FIELD IS FINISHED. |
| 5 | DECODING PROCEEDS TO THE NEXT FRAME. | START DISPLAY OF THE SECOND FIELD FROM THE FRAMESTORE. |

FIG. 2

| STEP | DECODE | DISPLAY |
|---|---|---|
| 1 | DECODE STARTS AND PROCEEDS TO THE MIDDLE OF THE FRAME. CHROMA SAMPLES ARE STORED AS IS. | THE SECOND FIELD OF THE PRECEDING FRAME IN DISPLAY ORDER IS BEING DISPLAYED. (SEE STEP 5). |
| 2 | THIS IS ONE FIELD TIME LATER. HALF OF THE FRAME IS DECODED. FRAMESTORE CONTAINS THE HALF FRAME. | BEGIN DISPLAY OF THE FIRST FIELD FROM THE FRAMESTORE. THE CHROMA SAMPLES ARE INTERPOLATED WITH (1/4,3/4) FILTER. EVERY EVEN FIELD LINE, THE INTERPOLATION USING (3/4,1/4) IS STORED IN ONE LINE. THE OTHER LINE IS AVAILABLE FOR DECODING. |
| 3 | THE DECODE AND DISPLAY ARE LOCKED: WHENEVER 16 LINES ARE DISPLAYED, THE ROW OF DECODED MACROBLOCKS GO INTO THE FRAMESTORE. | DISPLAY OF THE FIRST FIELD PROCEEDS. |
| 4 | DECODING IS FINISHED. FRAMESTORE CONTAINS THE CORRECT (i.e. READY TO DISPLAY) CHROMA VALUES FOR THE EVEN CHROMA LINES ONLY. | DISPLAY OF THE FIRST FIELD IS FINISHED. |
| 5 | DECODING PROCEEDS TO THE NEXT FRAME. | START DISPLAY OF THE SECOND FIELD FROM THE FRAMESTORE. EVEN FIELD LINES ARE DISPLAYED AS IS, ODD LINES ARE OBTAINED BY AVERAGING THE TWO EVEN LINES. |

MEMORY EFFICIENT DECODING OF VIDEO FRAME CHROMA

FIELD OF THE INVENTION

The present invention relates to video frame decoding and more particularly to a memory-efficient video frame decoding technique with frame chrominance interpolation which is particularly well-suited for use in MPEG-compliant decoding applications.

BACKGROUND OF THE INVENTION

A video frame in accordance with the MPEG-2 standard consists of three rectangular matrices of integers: a luminance matrix (Y) and two chrominance matrices (Cr and Cb). The chrominance format specifies the relative sizes of the Y, Cr and Cb matrices. For example, a 4:2:0 chrominance format specifies that the Cb and Cr matrices are one-half the size of the Y-matrix in both horizontal and vertical dimensions, while a 4:2:2 chrominance format specifies that the Cb and Cr matrices are one-half the size of the Y-matrix in the horizontal dimension and the same size as the Y-matrix in the vertical dimension. The video frame is divided into a plurality of macroblocks, with each macroblock including four 8×8 blocks of luminance samples and either two 8×8 blocks of chroma samples (4:2:0 format) or four 8×8 blocks of chroma samples (4:2:2 format). The frame may be a progressive frame, in which all samples of the frame represent the same instant in time, or an interlaced frame, in which alternating lines of the frame correspond to either a top field or a bottom field representing different instances in time. In a given interlaced frame, one of the two fields is meant to be displayed first. This field is referred to as the first field, and may be either the top or bottom field. Unless otherwise indicated, it will be assumed herein that the first field is the top field. Additional details regarding the MPEG-2 standard can be found in an International Standards Organization (ISO) document entitled "Information Technology Generic Coding of Moving Pictures and Associated Audio: Video," ISO/IEC 13818-2, Jan. 20, 1995, which is incorporated herein by reference.

The MPEG-2 video standard generally provides two types of upsampling to convert chroma samples of a video frame from a 4:2:0 chrominance format to a 4:2:2 chrominance format suitable for display. In the case of a progressive frame, the chroma samples are referred to as "frame chroma" and all chroma samples in the frame are utilized for proper upsampling of that frame. In the case of an interlaced frame, half of the chroma samples are used to upsample one field, and the other half of the chroma samples are used to upsample the other field. The upsampling process for interlaced frames can be performed using conventional memory-efficient luminance decoding algorithms without any loss of quality. However, applying such algorithms to a progressive frame generally involves treating the frame chroma as field chroma, which results in a significant degradation in decoded video quality.

FIG. 1 illustrates the steps involved in a conventional memory-efficient luminance decoding algorithm suitable for use with interlaced frames. This algorithm is referred to as a 2.5 framestore decoding algorithm in that it utilizes a 2.0 framestore portion of decoder memory for storing intracoded (I) and forward-only predictive (P) anchor frames, and a 0.5 framestore portion, plus one additional row of macroblock storage, for storing additional macroblock data used in decoding bidirectionally-predictive (B) frames. A framestore refers to an amount of decoder memory suitable for storing the macroblock data of a single frame. The decoding algorithm of FIG. 1 tightly couples the decoding and display operations, particularly in the case of B frames, in order to limit the required amount of decoder memory to a total of 2.5 framestores. The characteristics of I, P and B frames are described in greater detail in the above-cited ISO document.

In accordance with the conventional 2.5 framestore decoding algorithm, I and P frames are decoded and stored as anchor frames in the above-noted 2.0 framestore portion of decoder memory. While a given anchor frame is being decoded, the most recently decoded previous anchor frame is displayed. The decoding process for an interlaced B frame is shown in FIG. 1. The decoding process begins in Step 1 and proceeds to the middle of the frame, until the first half (i.e., first field) of the frame is decoded. The decoding of the current B frame utilizes the previously-stored I and P anchor frames. During Step 1, the second field of the preceding frame in the display order is displayed. The 0.5 framestore memory locations freed up during display of the second field of the previous frame are utilized to store decoded macroblocks for the first field of the current B frame. As noted above, the decode and display operations are tightly coupled, such that whenever 16 lines have been displayed, the corresponding 0.5 framestore memory locations are overwritten by a new row of decoded macroblocks. This assumes that the decoder is fast enough to decode the worst case row of macroblocks in a row time, corresponding to 16 NTSC or PAL line times. The above-noted additional row of macroblock storage is required because the decoding generally takes place a macroblock at a time, while the display is line-based.

Step 2 indicates that after one field time has elapsed, the first half (i.e., first field) of the current B frame has been decoded and placed in the 0.5 framestore portion of decoder memory, and the display of the first field of the current frame from the 0.5 framestore portion begins. Step 3 indicates that, as noted previously, the decode and display operations are locked such that whenever 16 lines are displayed, the corresponding locations in the 0.5 framestore portion of memory are overwritten with a new row of decoded macroblocks. Step 3 also indicates that the display of the first field of the current frame proceeds. In Step 4, the decoding of the second field of the current frame is complete, the display of the first field of the current frame is complete, and the 0.5 framestore portion of memory contains only the decoded second field of the current frame. In Step 5, the decoding operation proceeds to the next frame in the display order, and display of the second field from the 0.5 framestore portion of memory begins.

The above-described memory-efficient 2.5 framestore algorithm is suitable for use in decoding luminance samples, as well as upsampling field chrominance samples for interlaced frames. However, these and other similar algorithms are generally unsuitable for use in upsampling frame chroma of progressive frames. This is because proper upsampling of frame chroma in progressive frames generally requires the full set of frame chroma, while the algorithm overwrites certain of these values in order to provide improved memory efficiency. Applying the 2.5 framestore algorithm to frame chroma of a progressive frame involves treating the frame chroma as field chroma, which would result in a significant degradation in decoded video quality. Other frame chroma decoding techniques may be able to provide improved video quality for progressive frames, but such techniques are generally less memory efficient than the above-described 2.5 framestore technique. The use of such techniques will generally require an increase in the decoder memory capacity, and may therefore unduly increase the size, cost and complexity of the decoder.

As is apparent from the above, there is a need for a memory-efficient frame chroma decoding technique which is suitable for use with progressive frames and which produces higher quality decoded video than conventional memory-efficient techniques.

SUMMARY OF THE INVENTION

The present invention provides a memory-efficient video decoding technique which is well-suited for upsampling frame chroma of progressive frames. The decoding technique can decode MPEG-2 bidirectionally-predictive (B) frames using a 0.5 framestore memory along with a two framestore memory for decoded intraframe (I) and forward-only predictive (P) anchor frames, for a total of 2.5 framestores of simultaneous decoder memory capacity. The technique produces higher quality decoded video relative to that produced by applying conventional 2.5 framestore decoding to frame chroma of a progressive frame.

In accordance with one aspect of the invention, a progressive video frame including a plurality of lines of frame chroma samples is processed in the following manner. A first half or field of the progressive frame is decoded while a second field of a previous frame is being displayed. As the first field is being displayed, lines of interpolated chroma values are generated for both the first and second fields by: (i) applying a two-tap filter with coefficients ($\frac{1}{4}$, $\frac{3}{4}$) to lines of chroma samples to generate lines of interpolated chroma values for the first field; and (ii) applying a two-w tap filter with coefficients ($\frac{3}{4}$, $\frac{1}{4}$) to lines of chroma samples to generate lines of interpolated chroma values for the second field. The lines of interpolated values generated for the first field are displayed with the first field, while a given even line of interpolated values for the second field is written over one of the lines of chroma values used to generate the given even line of interpolated values. The other line of chroma values used to generate the given even line of interpolated values for the second field is allowed to be overwritten with additional progressive frame data, such that one chroma line of memory space is freed up for every two lines of displayed interpolated values. This allows the frame chroma decoding process to be performed in a memory-efficient manner utilizing a total of 2.5 framestores of decoder memory.

In accordance with another aspect of the invention, during display of the second field of the progressive frame, even lines of interpolated values for the second field are displayed as is, while odd lines of interpolated values for the second field are generated by averaging two adjacent even lines of interpolated values. This results in significantly less degradation in decoded video quality than would be produced by treating the frame chroma as field chroma in accordance with conventional 2.5 framestore frame chroma decoding techniques.

BRIEF DESCRIPTION OF THE DRAWINGS

FIG. 1 illustrates the steps of a conventional memory-efficient 2.5 framestore decoding process applied to an exemplary bidirectionally-predictive (B) frame.

FIG. 2 illustrates the steps of a memory-efficient 2.5 framestore decoding process in accordance with an exemplary embodiment of the present invention.

DETAILED DESCRIPTION OF THE INVENTION

FIG. 2 illustrates the steps of an exemplary memory-efficient decoding process in accordance with one possible embodiment of the present invention. It will be assumed for purposes of the description that a decoder implementing the exemplary decoding process is capable of decoding the worst case row of macroblocks in a row time (i.e., 16 NTSC or PAL line times). It will also be assumed that the total decoder memory capacity referred to herein includes an additional row of macroblock storage to accommodate the fact that decoding generally takes place a macroblock at a time, while display is line-based. It should be emphasized that the above assumptions are intended to simplify the description and are not requirements of the present invention. The exemplary decoding process is applied in FIG. 2 to a progressive MPEG-2 bidirectionally-predictive (B) frame. It should be understood that this is by way of example and not limitation, and that the present invention is applicable to other types of frames configured in accordance with other video standards.

In Step 1 of FIG. 2, decoding of a progressive B frame starts and proceeds to the middle of the progressive frame, while the second field of the preceding frame in the display order is being displayed. The decoding of the B frame utilizes previously-decoded I and/or P anchor frames which occupy a 2.0 framestore portion of decoder memory. The frame chroma samples of the current B frame are stored as is in a 0.5 framestore portion of decoder memory. In Step 2, one field time has elapsed, and half of the progressive frame has been decoded. The 0.5 framestore portion of the decoder memory contains the decoded first half of the current progressive frame, which will also be referred to as the first field of the current frame. The first field of the current frame will also be referred to herein as the top field, while the second field will be referred to as the bottom field.

The display of the first field of the current frame from the 0.5 framestore portion of memory begins in Step 2. In accordance with one aspect of the invention, the frame chroma samples stored in the 0.5 framestore portion of decoder memory in Step 1 are interpolated by applying two-tap filters to successive frame lines. The two-tap filters may have filter coefficients of ($\frac{1}{4}$, $\frac{3}{4}$) and ($\frac{3}{4}$, $\frac{1}{4}$). The ($\frac{1}{4}$, $\frac{3}{4}$) filter is applied to the lines of the top field, while the ($\frac{3}{4}$, $\frac{1}{4}$) filter is applied to the lines of the bottom field. The resulting interpolated chroma samples are stored in corresponding lines of the 0.5 framestore portion of the decoder memory. It should be noted that the interpolation filtering may be omitted for the very top and bottom chroma samples in the frame, although the following description will not include further reference to this possible boundary condition.

Figure 3:
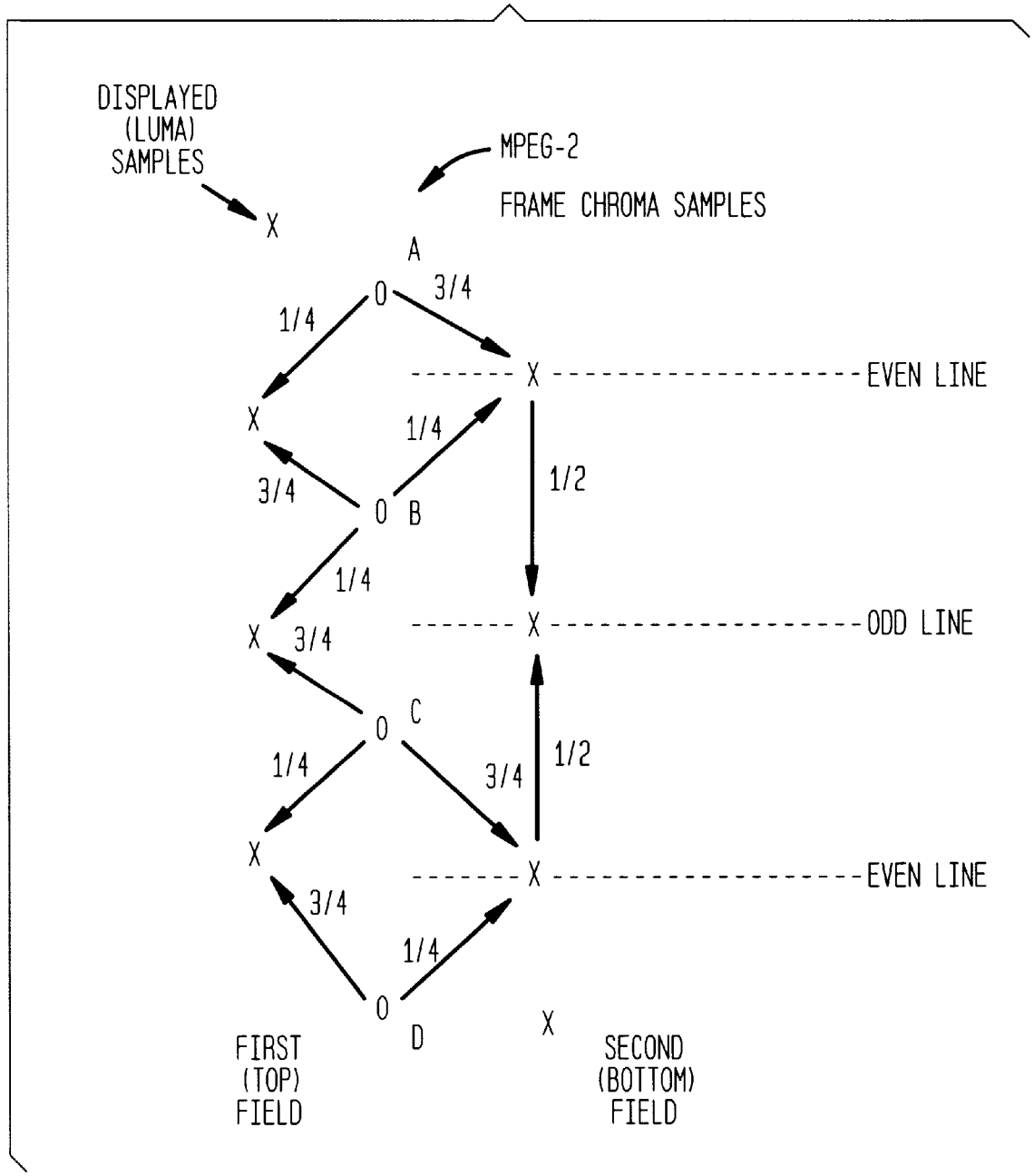
FIG. 3 is a diagram illustrating frame chroma upsampling in accordance with the exemplary decoding process of FIG. 2.

FIG. 3 illustrates the above-noted frame chroma interpolation operations in greater detail. The MPEG-2 frame chroma samples of the current B frame are designated by an O while the resulting displayed luma samples are designated by an X. FIG. 3 shows a vertical column of decoded chroma samples A, B, C and D. For the displayed samples located between the chroma samples A and B, the interpolated value of (3B+A)/4 is used for the first (top) field and the interpolated value (3A+B)/4 is used for the second (bottom) field.

In the decoding process of FIG. 2, both of these interpolated values are calculated during display of the first field using the chroma samples A and B. The first field interpolated value is then displayed, while the second field interpolated value is written over the chroma sample A in the 0.5 framestore portion of memory. Ideal chroma upsampling for the next displayed sample of the second field would require the calculation of (3B+C)/4 and therefore the continued storage of even line chroma sample B until the display of the second field. The present invention conserves decoder memory by interpolating this chroma sample B during the display of the second field, as will be described in greater detail below. This allows the memory locations corresponding to the line containing chroma sample B to be overwritten during subsequent decoding operations.

Referring again to FIG. 2, Step 2 indicates that first and second field interpolated values are calculated using the (¼, ¾) and (¾, ¼) filters, respectively. The resulting interpolated values for every even field line of the second field are stored in one of the two lines of memory which stored the chroma samples used in the interpolation. The other line of memory is made available for storing new decoded macroblock data, such that one of the lines of chroma samples used to calculate the interpolated values will be overwritten before the rest of the second field is decoded and displayed. The process of the present invention thus frees up one chroma line in memory for every two displayed field lines, and permits a memory-efficient 2.5 framestore technique to be utilized for frame chroma decoding. As will be described below, decoded video quality is preserved by interpolating the previously overwritten chroma samples during decoding and display of the second field.

Step 3 of FIG. 2 indicates that, as in the conventional 2.5 framestore decoding previously described, the decode and display operations are locked such that whenever 16 lines are displayed, the corresponding locations in the 0.5 framestore portion of memory are overwritten with a new row of decoded macroblocks, and the display of the first field of the current frame proceeds. In Step 4, the decoding of the second field of the current frame is complete, and the display of the first field of the current frame is complete. The 0.5 framestore portion of memory contains the decoded second field of the current frame, but the correct interpolated values for the even displayed field lines only. As noted above, the chroma samples needed to calculate interpolated values for the odd displayed field lines of the second field were allowed to be overwritten before the interpolated values could be calculated. In Step 5, the decoding operation proceeds to the next frame in the display order, and display of the second field from the 0.5 framestore portion of memory begins. The even lines of the second field, for which correct interpolated values were calculated during display of the first field, are displayed as is, while each of the odd field lines are obtained by averaging two adjacent even lines. In this manner, only the odd field lines in the second field are distorted as a result of allowing lines of chroma samples to be overwritten, and the resulting decoded video quality is substantially better than that associated with conventional techniques.

FIG. 3 illustrates the averaging process which is used to obtain the odd field lines for display in the second field. It can be seen that the displayed sample on the odd field line of the second field between chroma samples B and C is not based on an interpolation of B and C but is instead calculated as an average of the adjacent even line interpolated displayed samples. Therefore, instead of having the interpolated value (3B+C)/4 as would be the result in an ideal frame chroma interpolation process, the odd line displayed sample has the value:

$$½(3A+B)/4+½(3C+D)/4=⅜A+⅛B+⅜C+⅛D$$

which produces better decoded video quality than would result from using only chroma values A and C for interpolation as in conventional 2.5 framestore progressive frame decoding.

Figure 4:
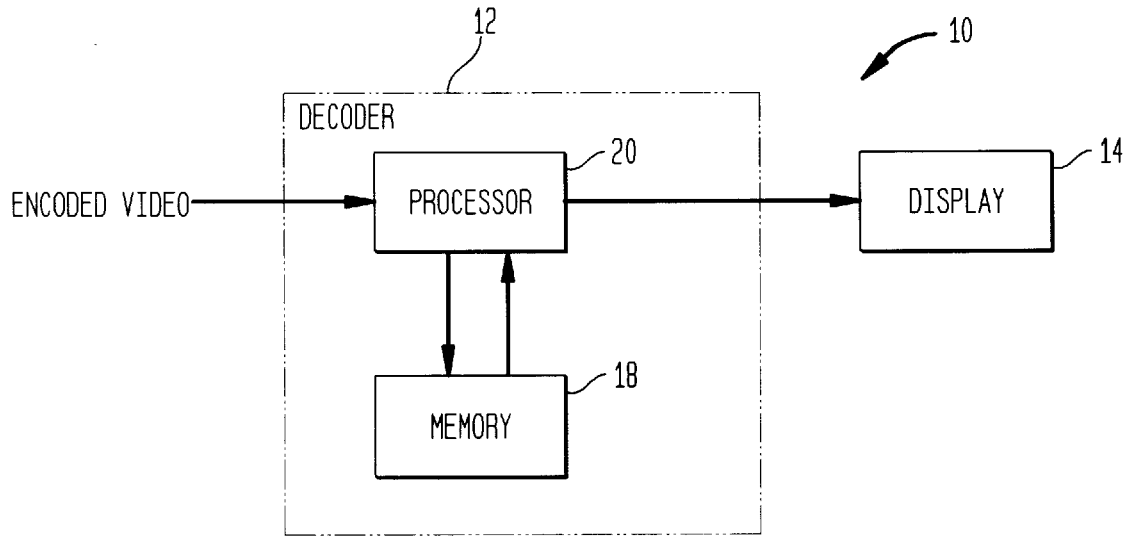
FIG. 4 is a block diagram of an exemplary video decoding system in which the present invention may be utilized.

FIG. 4 shows an exemplary video decoding system 10 in which the memory-efficient progressive frame decoding of the present invention may be implemented. The decoding system 10 includes a video decoder 12 and a display 14. It will be assumed without limitation in the following description that the decoder 12 is an MPEG-2 compliant decoder unless otherwise noted. The decoder 12 receives an encoded video frame sequence from a corresponding video encoder, a transport stream decoder or a storage device, and processes the encoded bit stream to generate a sequence of decoded frames which are supplied to display 14 in the manner described in conjunction with FIG. 2 above. The decoder 12 includes a memory 18 and a processor 20. The processor 20 receives the encoded video and provides conventional rate control and decoding operations in a well-known manner. For example, the processor 20 in conjunction with a rate buffer (not shown) can perform video decompression operations including spatial and temporal decompression. The processor 20 may be implemented in the form of an application-specific integrated circuit (ASIC), a microprocessor or other digital data processor, or a suitable portion thereof. The memory 18 may be implemented as static random access memory (SRAM), dynamic random access memory (DRAM) or other suitable memory device and may be combined with processor 20 into a single ASIC or other digital data processor.

Figure 5:
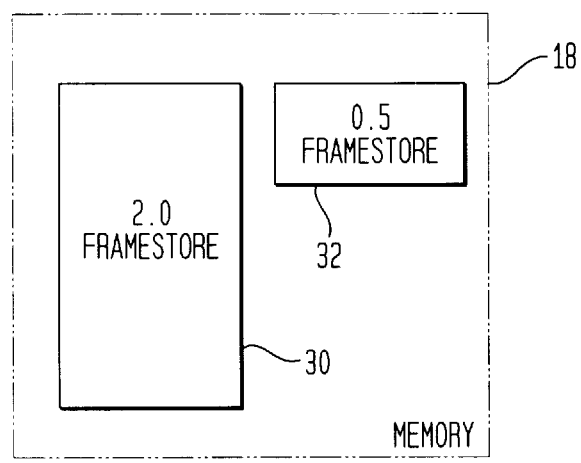
FIG. 5 is a block diagram of an exemplary 2.5 framestore memory suitable for use in a memory-efficient decoding process in accordance with the present invention.

FIG. 5 illustrates an exemplary decoder memory 18 suitable for use with the present invention. The memory 18 includes a 2.0 framestore portion 30 which is used to store the above-noted I and/or P anchor frames used in the decoding of a B frame. The memory 18 also includes a 0.5 framestore portion 32 which is used to provide the additional storage locations utilized in decoding a B frame as described in conjunction with FIG. 2 above. The total simultaneous frame storage capability of the exemplary memory 18 used for frame chroma decoding is therefore on the order of 2.5 framestores. The individual portions of memory 18 of FIG. 5 and the rate buffer of decoder 12 may be configured as contiguous or non-contiguous storage locations in a single memory unit. It should also be noted that the decoder memory 18 may include additional buffer space for use in other decoding operations.

The above-described embodiments of the invention are intended to be illustrative only. Numerous alternative embodiments within the scope of the appended claims will be readily apparent to those skilled in the art.

What is claimed is:

1. A method of decoding a progressive video frame including a plurality of lines of frame chroma samples, wherein the progressive frame being a frame where the progressive frame bit equals 1, the method comprising the steps of:

generating first and second lines of interpolated values using at least two of the plurality of lines of frame chroma samples;

displaying the first line of interpolated values with a first field of the progressive frame; and storing the second line of interpolated chroma values in a portion of a memory previously occupied by at least one of the plurality of lines of frame chroma samples.

2. The method of claim 1 wherein the step of generating first and second lines of interpolated values using at least two of the plurality of lines of frame chroma samples further includes the steps of:

generating the first line of interpolated values by applying a first multiple-tap filter to first and second lines of the frame chroma samples; and generating the second line of interpolated values by applying a second multiple-tap filter to the first and second lines of the frame chroma samples.

3. The method of claim 2 wherein the first multiple-tap filter comprises a two-tap filter having filter coefficients of (¼, ¾).

4. The method of claim 2 wherein the second multiple-tap filter comprises a two-tap filter having filter coefficients of (¾, ¼).

5. The method of claim 1 wherein the step of storing the second line of interpolated chroma values in a portion of a memory previously occupied by at least one of the plurality of lines of frame chroma samples further includes overwriting memory locations containing one of the plurality of lines of frame chroma with the second line of interpolated chroma values.

6. The method of claim 5 further including the step of allowing another of the plurality of lines of frame chroma samples used to generate the first and second lines of interpolated values to be overwritten with other data of the progressive frame after the first and second lines of interpolated values have been generated.

7. The method of claim 1 further including the step of displaying the second line of interpolated values with a second field of the progressive frame.

8. The method of claim 1 further including the step of generating a third line of interpolated values for display with a second field of the progressive frame, wherein the third line is generated as an average of the second line of interpolated values and at least one additional line of interpolated values.

9. An apparatus for decoding a progressive video frame including a plurality of lines of frame chroma samples, wherein the progressive frame being a frame where the progressive frame bit equals 1, the apparatus comprising:

a processor operative to generate first and second lines of interpolated values using at least two of the plurality of lines of frame chroma samples, and to direct the display of the first line of interpolated values with a first field of the progressive frame; and a memory coupled to the processor, wherein the second line of interpolated chroma values are stored in a portion of the memory previously occupied by at least one of the plurality of lines of frame chroma samples.

10. The apparatus of claim 9 wherein the processor generates the first line of interpolated values by applying a first multiple-tap filter to first and second lines of the frame chroma samples, and generates the second line of interpolated values by applying a second multiple-tap filter to the first and second lines of the frame chroma samples.

11. The apparatus of claim 10 wherein the first multiple-tap filter comprises a two-tap filter having filter coefficients of (¼, ¾).

12. The apparatus of claim 10 wherein the second multiple-tap filter comprises a two-tap filter having filter coefficients of (¾, ¼).

13. The apparatus of claim 9 wherein the processor is further operative to overwrite memory locations containing one of the plurality of lines of frame chroma with the second line of interpolated chroma values.

14. The apparatus of claim 13 wherein another of the plurality of lines of frame chroma samples used to generate the first and second lines of interpolated values is overwritten with other data of the progressive frame after the first and second lines of interpolated values have been generated.

15. The apparatus of claim 9 wherein the processor is further operative to direct the display of the second line of interpolated values with a second field of the progressive frame.

16. The apparatus of claim 9 wherein the processor generates a third line of interpolated values for display with a second field of the progressive frame, as an average of the second line of interpolated values and at least one additional line of interpolated values.

* * * * *